June 6, 1961  J. GRUSSEN  2,987,206
PLASTIC CAP FOR CONTAINERS
Filed March 30, 1959  5 Sheets-Sheet 1

INVENTOR
Jean Grussen
By
ATTORNEYS

June 6, 1961  J. GRUSSEN  2,987,206
PLASTIC CAP FOR CONTAINERS
Filed March 30, 1959  5 Sheets-Sheet 2

INVENTOR
Jean Grussen

ATTORNEYS

June 6, 1961 J. GRUSSEN 2,987,206
PLASTIC CAP FOR CONTAINERS
Filed March 30, 1959 5 Sheets-Sheet 4

INVENTOR
Jean Grussen
By Holcomb, Wetherill...
ATTORNEYS

United States Patent Office 2,987,206
Patented June 6, 1961

2,987,206
PLASTIC CAP FOR CONTAINERS
Jean Grussen, 6 Rue Adolphe Yvon, Paris, France
Filed Mar. 30, 1959, Ser. No. 802,871
7 Claims. (Cl. 215—7)

Container caps made from plastic materials presently in use insure most often only an imperfect sealing where plugging of pressure containers is concerned. On the other hand, such caps do not exhibit an inviolable character, i.e. it is possible to replace said caps without damaging the same on containers or bottles the contents of which have previously been partially removed.

The present invention has for one of its objects to provide a container cap made from a plastic material moulded in one piece whereby said cap is capable of sealing a bottle, the contents of which comprises an upper layer of gases under a relatively high pressure, for example between about 70 and about 85 p.s.i. The cap according to this invention is such that after the first opening of the bottle it is still possible to replace said cap on the bottle while obtaining a satisfactory sealing, the user noticing, however, that the bottle has previously been opened.

Another object of the present invention is to provide a container or bottle cap made from a plastic material having a bulkiness analogous to that of the caps presently in use and thus being adapted to be used with general type capping machines.

Yet another object of this invention is to provide a cap for a bottle, which is made in one piece from a moulded plastic material and which is characterized by the fact that it comprises laterally a plurality of tongues bearing on the bottle neck, said tongues being connected one with another by at least a strip of plastic material which surrounds the cap periphery and connects the various tongues one with another.

The cap according to the present invention is also characterized by the fact that the conformation of that part thereof which engages the bottle is such that, when one positions the cap on the bottle, stresses are built up in the inside of the cap which cause said tongues to spread apart from the bottle neck when the strip which connects the various tongues is broken. Such spreading of the tongues is the very easily visible evidence that the bottle sealed with the cap according to this invention has been previously opened.

Yet another object of the present invention is to provide an inviolable cap moulded in one piece from a plastic material, such cap being characterized by the fact that it comprises in combination with an outer portion having weaker zones a rigid central portion engaging into the container or bottle neck to obtain a tight seal, this latter portion being connected to the outer portion in a flexible manner.

It can be seen that the cap according to this invention comprises essentially an outer portion imparting inviolability to the cap and is connected in a flexible manner to an inner portion insuring the seal.

In order that the invention may be completely understood the same will now be described in an illustrative and by no means limitative manner in connection with three illustrative embodiments of the invention with reference to the annexed drawings, in which.

Figure 1:
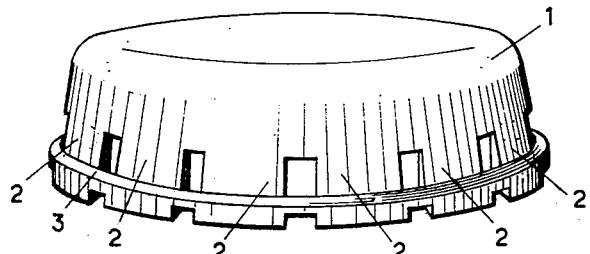
FIG. 1 is a perspective view of a first embodiment of a container or bottle cap according to the teachings of the present invention.

Referring to the drawings, there is shown in FIG. 1 a cap bottom 1, a plurality of tongues 2 and a strip 3 which extends all around the cap and connects the tongues 2 one with another.

The cap comprises on the periphery thereof a circular inner boss 4 which is adapted to engage a corresponding outer groove 7 of the bottle neck and an inner circular shoulder 5 having a triangular-shaped section which is provided in the periphery of the bottom 1.

It is to be noted also that the strip 3 is of a parallelogram-shaped section which has its greater width parallel to the cap bottom 1.

Figure 2:
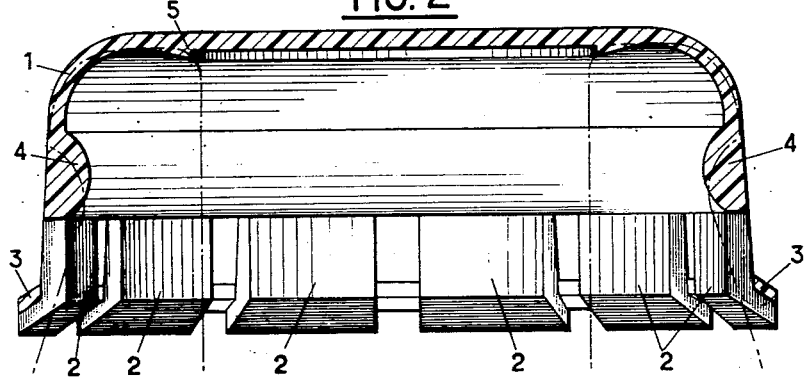
FIG. 2 is an enlarged sectional view of the cap illustrated in FIG. 1.

There is shown in FIG. 2 in phantom lines 6 the profile of the bottle on which the cap is adapted to be fitted.

It may be seen that the outer diameter of the bottle neck is slightly greater than the maximum inner diameter of the cap. Also, the inner circular boss 4 of the cap is located at a level slightly higher than that of the corresponding groove of the bottle neck.

On the other hand, said shoulder 5, which constitutes an extra thickness in the inside of the cap bottom 1 is located at a place which corresponds to the highest portion of the bottle.

Figure 3:
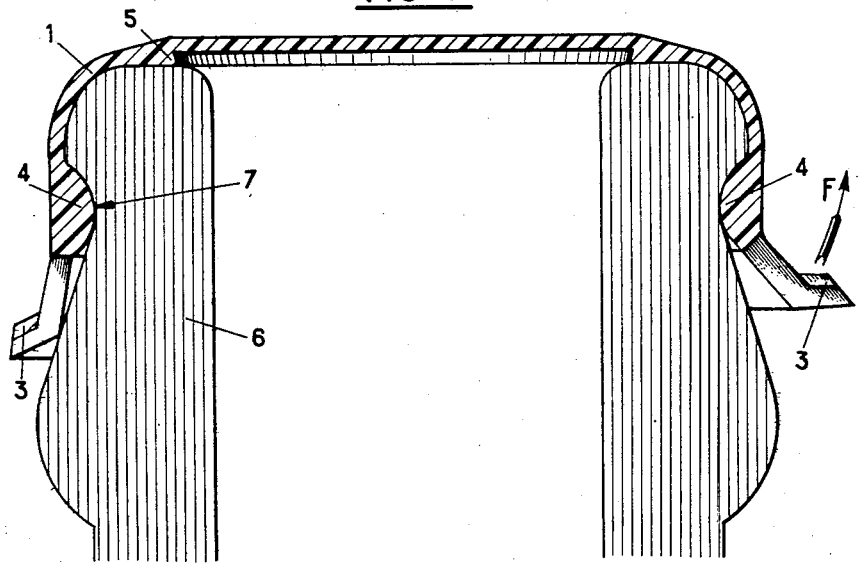
FIG. 3 is a sectional view corresponding to FIG. 2, with the cap positioned on a bottle neck.

FIG. 3 shows in section the bottle 6 on which the cap illustrated in FIG. 2 has been disposed.

When comparing FIGS. 2 and 3, it can be seen that once the cap is disposed on the bottle it undergoes forces which extend its bottom 1. Such forces result from: (1) the fact that the inner diameter of the cap is less than the outer diameter of the bottle neck; (2) the fact that the boss 4 is spaced from the cap bottom 1 by a distance which is less than the distance from the groove 7 of the bottle and the top of the latter; and (3) that the shoulder 5 bears on the upper portion of the bottle, which distorts the cap bottom 1 upwardly.

Through the whole of the above-mentioned forces the boss 4 is caused to bear on the bottle neck mainly in an axial direction of the bottle rather than in a radial direction, as was the case in the caps used hitherto. It is this characteristic which is the original concept of the present invention which insures an effective plugging, even in the case of pressure containers.

Under such conditions, it may be seen that the strip 3 functions merely to hold the tongues 2 connected one with another. This is the reason why said strip, which is not used to insure the seal of the plugging, may have a relatively weak cross section.

If, by applying a force in the direction of arrow F (FIG. 3) one tears the strip 3 on both sides of one tongue 2, said tongue spreads apart from the bottle neck, as represented in the right hand part of FIG. 3.

It is clear that such movement of the tongue 2 results essentially from the stresses acting on the cap when it is disposed on the bottle neck.

To open the bottle, it is sufficient, after having torn the strip 3 at a number of places, to apply an effort on the cap so as to remove the same from the bottle neck. Later, it is possible to replace the cap on the bottle while insuring an efficient plugging, but it is immediately noticed that the cap has previously been removed, by virtue of the fact that some of the tongues 2 spread out by themselves from the bottle neck. The seal of the plugging is nevertheless insured as it was previously, because the stresses to which the cap is submitted remain unchanged.

The positioning of a new cap on the bottle can be made without any difficulty by means of a capping machine, care being taken however to avoid breaking of the strips connecting the tongues together.

Figure 4:
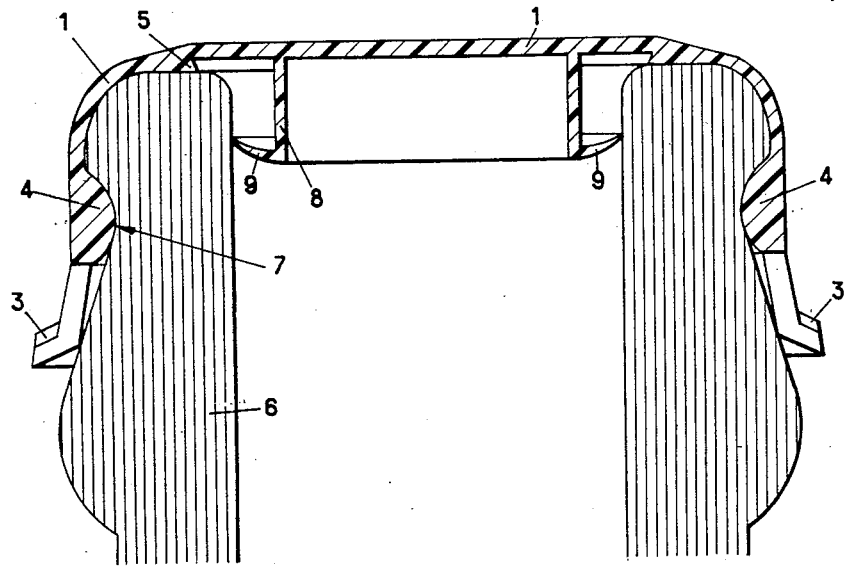
FIGS. 4 and 5 show caps according to the present invention with a sealing collar.
Figure 5:
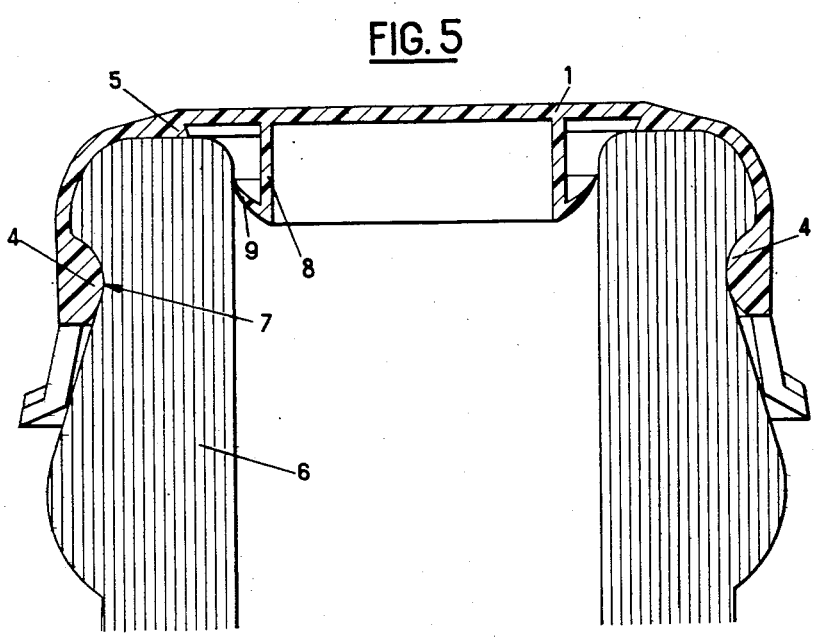

FIGS. 4 and 5 show caps according to this invention of the type of those represented in FIGS. 1, 2 and 3, but they comprise on the cap bottom 1 a collar 8 provided with a lateral flange 9 bearing on the inside of the bottle neck.

It has been ascertained that, according to the present invention, the caps shown in FIGS. 1, 2 and 3 provide a thorough seal in the case where the inside of the bottle is under a relatively high pressure.

However, in the case where the bottles are of a fabrication rather poor and exhibit particularly unevenesses on their necks which result from a bad junction between the two halves of the mould, there may occur a leakage when the bottles are filled with liquids which are not under any excess of pressure.

To avoid this drawback, the caps shown in FIGS. 4 and 5 are provided with an inner collar 8 having an outer flange 9. Said flange 9 is of substantially triangular shape, the outside sharp apex of which is folded toward the cap bottom 1.

The sharp edge of the flange 9 engages the inner wall of the bottle neck and insures thus a seal under low pressures.

It is well known that owing to frabrication unevennesses the inner diameter of the bottle neck varies within relatively large limits and it is clear that the cap flange 9 according to this invention engages the inside of said neck irrespective of the inner diameter of the latter, thus insuring a perfect seal, even in the case of bottles the contents of which is not submitted to any excess of pressure.

On the other hand, by having provided the collar 8 and the flange 9, fixation of the cap on the bottle neck is further enhanced by a wedging action.

FIGS. 6 to 12 inclusive show the second and the third embodiments of the present invention, wherein the outer collar 11 comprises on almost all the height thereof rectangular apertures 12 equally spaced on the periphery of said collar 11. Said apertures 12 are spaced apart by tongues 13 which are connected one with another by a strip 14 extending entirely on the inner periphery of the cap.

Figure 7:
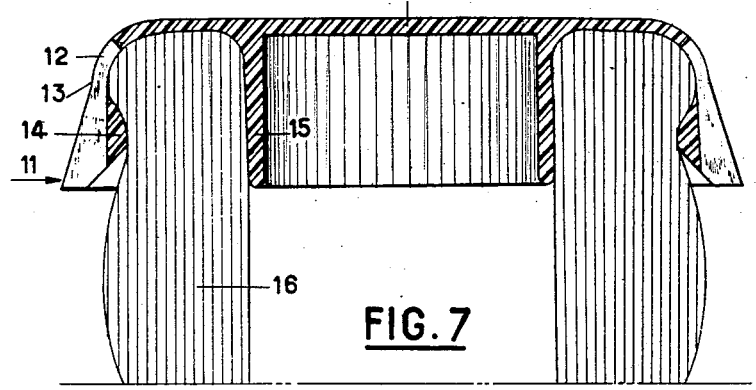
FIG. 7 is a sectional view of the cap shown in FIG. 6.

FIG. 7 shows also the inner collar 15 which bears upon the inside of the bottle neck 16 and insures a seal, and the strip 14 which engages the outer groove of said neck.

Figure 8:
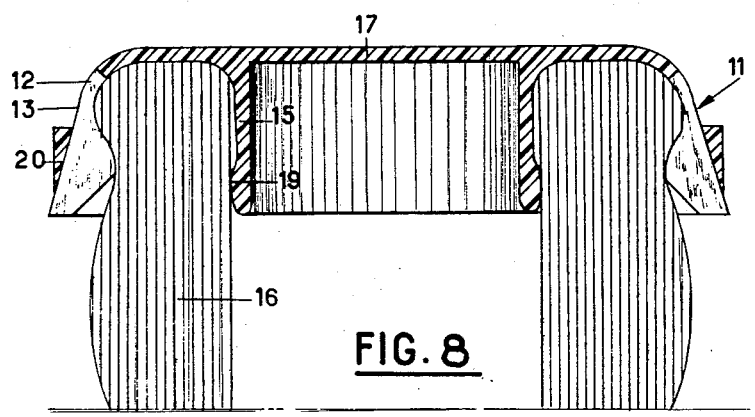
FIGS. 8, 9 and 10 are sectional views of alternate forms of the cap shown in FIG. 7.

In the alternative form illustrated in FIG. 8, the cap is provided with an inner collar 15 having an outer boss 19 insuring a seal by engaging the inside of the bottle neck.

In said alternative form, the strip 20, which is triangular-shaped in section, is located outside of the tongues 13 and does not engage the bottle.

Figure 9:
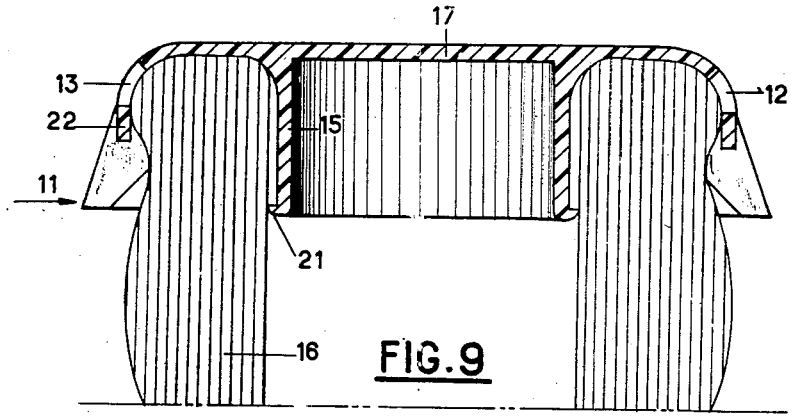

There can be seen in FIG. 9, which shows an alternate form of the cap of this invention, an inner collar 15 provided with a flange 21. Said flange has a triangular shape in section provided with a sharp edge which bears on the inner wall of the bottle neck 16 and thus insures a seal. Otherwise, it can be seen that the strip 22 is located at the medial part of the tongue 13.

Figure 10:
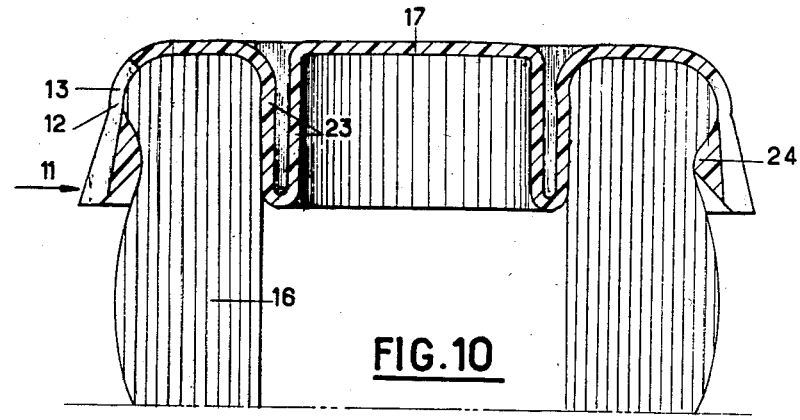

In still an alternate form of my invention shown in FIG. 10, the inner collar comprises a double wall 23 of U-shaped section which insures in a known manner plugging of the container. As in the alternate form shown in FIG. 7, the strip 24 engages the outer groove of the bottle neck.

Figure 11:
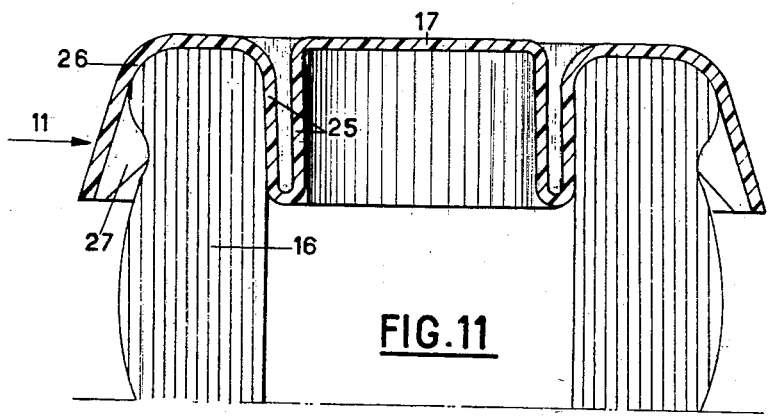
FIG. 11 illustrates a third embodiment according to the present invention.

A third embodiment according to this invention is shown in FIG. 11 wherein the flexible connection between the outer and the inner portions of the cap is obtained by means of a continuous thin wall 26, while in the first embodiment shown in FIGS. 6 to 9 the flexibility of the connection existing between the outer and the inner portions of the cap is obtained by the fact that the outer portion is cut into tongues 13 by separating apertures 12 which extend upwardly to the vicinity of the cap bottom 17.

Thus, in the embodiment shown in FIG. 11, the outer portion of the cap is constituted by a continuous thin skirt 26 which extends on all the periphery of the cap, inner bosses 27 being provided which are equally spaced apart on the inner periphery of said skirt and engaging the outer bottle groove in the bottle neck.

As for the cap shown in FIG. 10, a double U-shaped wall 25 insures a seal.

Owing to the face that, according to my invention, the outer portion of the cap is connected in a flexible manner to the inner portion insuring the seal, as soon as one applies a force on the crown of the cap in order to open the container, the strip is immediately broken at a number of points before the central part of the cap clears the bottle neck.

Figure 6:
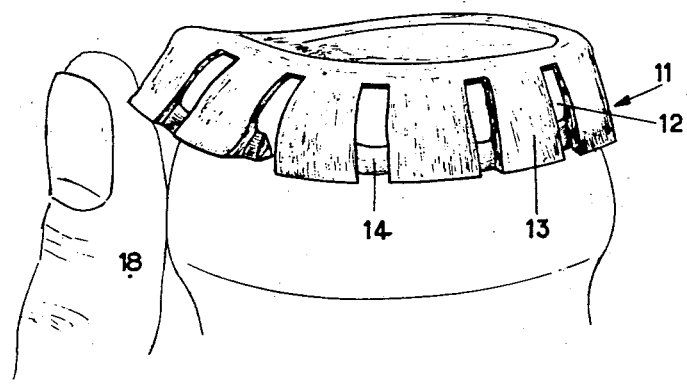
FIG. 6 is a perspective view of a second embodiment of the cap according to the present invention illustrating the step of removing the cap.

FIG. 6 shows how tearing of the strip 14 occurs when one opens the container by lifting the outer collar by means of one's thumb 18 sliding against the bottle neck.

It is clear that, according to the present invention, it is possible to realize a plastic material cap directly obtained by moulding and having a positive character of inviolability, owing to the fact that, thanks to the flexible connection between the recited outer and inner portions, it is absolutely impossible to remove said cap without breaking the afore-mentioned strip, even while taking all the possible precautions.

As it can be seen, another advantage of the caps according to my invention results from the fact that the outer dimensions of said caps are of the same order as those of the caps generally used hitherto, which permits to place the same by means of common type capping machines.

Figure 12:
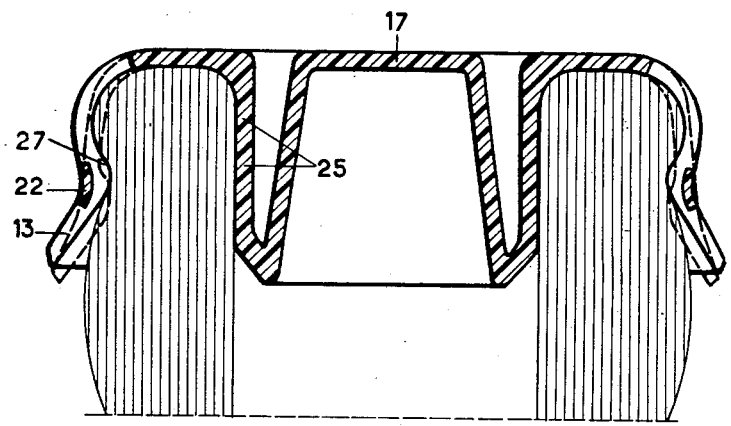
FIG. 12 is a sectional view of an alternate form of said third embodiment.

FIG. 12 shows an alternative form of the third embodiment according to my invention. There is illustrated again in this figure the cap bottom 17 and the double U-shaped wall 25 insuring the seal. Said alternative form is characterized by the fact that the cap, when it is in a rest state (as shown in dash-line in the drawings) has an inner diameter less than the outer diameter of the upper portion of the bottle.

As it can be seen clearly in the drawings, when my cap is placed on the bottle (as shown in solid lines in FIG. 12), the inner bosses 27 provided on the tongues 13 engage with a certain force the upper part of the outer groove of the bottle neck. This results in internal stresses in the cap which cause the latter to engage the upper part of the neck, thus insuring a plugging having a perfect seal.

It is of course understood that the above embodiments as described and shown in the drawings are given only in an illustrative and by no way limitative sense and that those skilled in the art may bring thereto any desirable modifications within the scope of the present invention as defined in the appended claims.

In particular, it is clear that the caps according to this invention which are especially adapted to the plugging of bottles, may be as well used to plug any container.

What I claim is:

1. A bottle cap consisting of a single piece of resilient plastic material and comprising a flat central cover for said bottle carrying an integral depending sealing ring dimensioned to be resiliently urged against the neck of said bottle below said cover, said cap terminating peripherally in a plurality of tongues positioned to depend outside said bottle, said tongues being laterally connected by rupturable strips so weak as to be broken by any attempt to lift said cap off said bottle by means of said tongues, and said sealing ring being urged against said bottle rim independently of said tongues.

2. A bottle cap as claimed in claim 1 adapted to close a bottle having a shoulder on its outer surface encircling its neck, said sealing ring being positioned to engage said outer surface and being provided with an inwardly projecting shoulder spaced from said cover by a distance slightly less than the distance between said bottle shoulder and the top of said bottle, so that when said cap shoulder is forced over said bottle shoulder it exerts an axial pressure thereon.

3. A bottle cap as claimed in claim 2 in which said tongues depend from said sealing ring so as to be biased outwardly when said cap shoulder is forced over said bottle shoulder.

4. A bottle cap as claimed in claim 1 in which the lower surface of said central cover carries an inwardly projecting circular shoulder which is triangular in cross-section.

5. A bottle cap as claimed in claim 1 in which there are two sealing rings depending from said cover, one of which is positioned to be resiliently urged against the outer surface of the neck of the bottle and the other of which is positioned to press against the inner surface of said neck.

6. A bottle cap as claimed in claim 1 in which said sealing ring is positioned to press against the outer surface of the neck of the bottle and said tongues depend from said sealing ring.

7. A bottle cap as claimed in claim 1 in which said sealing ring is positioned to press against the inner surface of the neck of the bottle and said tongues depend directly from said cover.

References Cited in the file of this patent

UNITED STATES PATENTS

| | | |
|---|---|---|
| 2,669,369 | Towns | Feb. 16, 1954 |
| 2,698,108 | Schwartz | Dec. 28, 1954 |
| 2,768,762 | Guinet | Oct. 30, 1956 |
| 2,820,563 | Bronnimann | Jan. 21, 1958 |